P. J. DOCKRAY, DEC'D.
M. J. DOCKRAY, ADMINISTRATRIX.
STOP MOTION FOR COMBERS AND THE LIKE.
APPLICATION FILED OCT. 23, 1916.

1,252,097.

Patented Jan. 1, 1918.
2 SHEETS—SHEET 1.

Witness
Chas. L. Griesbauer

Inventor
Peter J. Dockray, dec'd
by Mary J. Dockray,
Administratrix
Roy E. Burnham
Attorney P. J. DOCKRAY, DEC'D.
M. J. DOCKRAY, ADMINISTRATRIX.
STOP MOTION FOR COMBERS AND THE LIKE.
APPLICATION FILED OCT. 23, 1916.
1,252,097.
Patented Jan. 1, 1918.
2 SHEETS—SHEET 2.
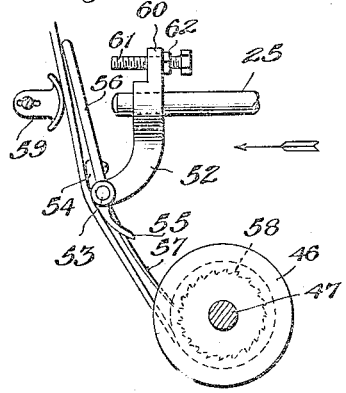
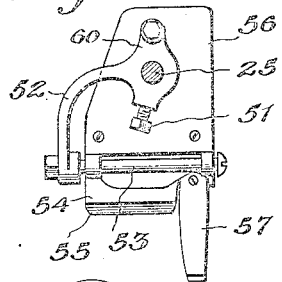
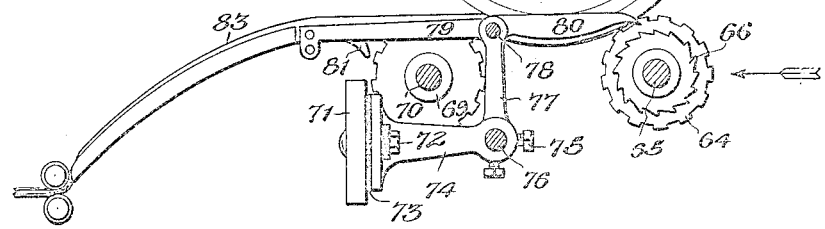
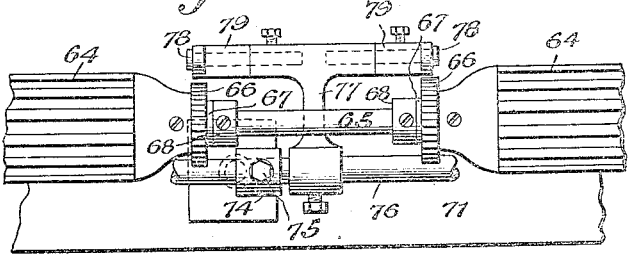
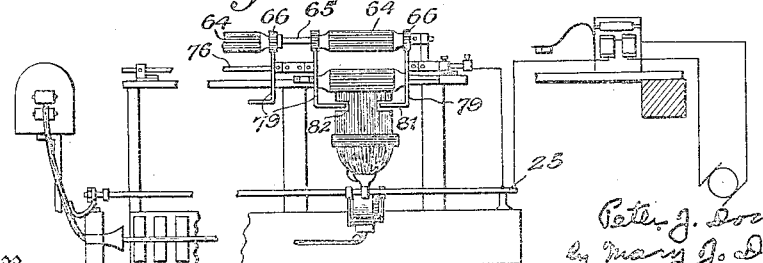

UNITED STATES PATENT OFFICE.

PETER J. DOCKRAY, DECEASED, LATE OF WOONSOCKET, RHODE ISLAND, BY MARY J. DOCKRAY, ADMINISTRATRIX, OF WOONSOCKET, RHODE ISLAND.

STOP-MOTION FOR COMBERS AND THE LIKE.

1,252,097.   Specification of Letters Patent.   Patented Jan. 1, 1918.

Original application filed September 5, 1914, Serial No. 860,401. Divided and this application filed October 23, 1916. Serial No. 127,296.

*To all whom it may concern:*

Be it known that PETER J. DOCKRAY, deceased, late a citizen of the United States, residing at Woonsocket, in the county of Providence and State of Rhode Island, invented certain new and useful Improvements in Stop-Motions for Combers and the like, of which the following is a specification, reference being had therein to the accompanying drawing.

This invention provides a stop-motion for use in association with combers and other fiber-treating machines, and it is an object of the invention to provide efficient and reliably-acting means, the functioning of which is dependent upon occurrence of certain conditions in the material passing through the machine.

More particularly, the invention relates to means, operating upon the exhaustion or absence of material after passing rolls affecting movement of the material, to close and reliably maintain closed for the period necessary an electric circuit that initiates operation of mechanism that operates to stop the machine with which the invention is associated, as shown by the application of said Peter J. Dockray, for stop-motion for combers and the like, filed September 5, 1914, Ser. No. 860,401, of which the present application is a division.

While it is not the intention to limit the application of the invention to any particular machine for treating material while in substantially continuous movement, the invention, for purposes of explanation, is described as associated with a cotton-comber. In such a machine the stop-motion should operate when there is a lap run out, a lap up on a detaching-roll, a pulling apart of sliver on the table, a pulling apart of sliver between the draw-box calender-rolls and the coiler, and a roll-lap in the draw-box; and the stop-motion provided by this invention is arranged to stop the machine on occurrence of any of these conditions.

When read in connection with the description herein, the details of construction and arrangement of parts contemplated by the invention will be apparent from the accompanying drawings, forming part hereof, wherein an embodiment of the invention is disclosed, for purposes of illustration.

While the disclosures herein now are considered to exemplify a preferable embodiment of the invention, it is not the intention to be limited necessarily thereto in interpretation of the claims, as alterations within the limits of the claims can be made without departing from the nature and spirit of the invention.

Like reference-characters refer to corresponding parts in the views of the drawings, of which—

Fig. 5 is a side view of a circuit-closing device between the draw-box calender-rolls and the coiler;

Fig. 6 is a view of parts as seen when looking in the direction of the arrow, Fig. 5;

Fig. 7 is a side view of a lap-run-out motion;

Fig. 8 is a view thereof looking in the direction of the arrow, Fig. 7; and

Fig. 9 is a plan view of the lap-run-out motion and other parts.

Figure 1:
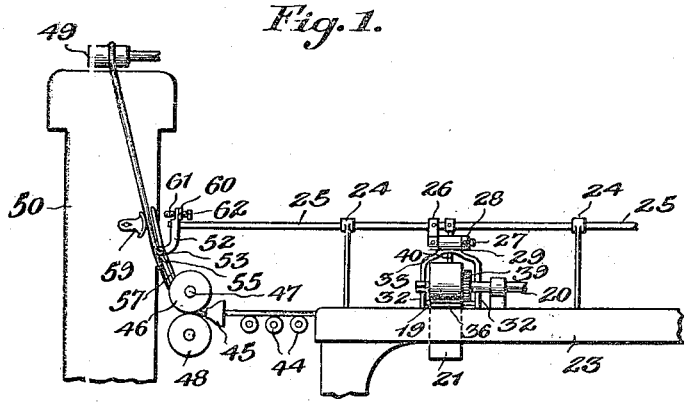
Figure 1 is a view in elevation of a portion of a comber.

Referring more particularly to the drawings, in which parts of a comber as hereinbefore mentioned are disclosed, 17 designates a sliver-pan into which sliver is delivered from the combing mechanism of the machine and whence it is drawn as a round strand through a trumpet 18 by an upper calender-roll 19 on a shaft 20 and a lower calender-roll 21 on a shaft 22 and delivered onto a sliver-table 23, one set of such parts being shown as exemplary of others in the machine.

Extending along the sliver-table and supported on and insulated from the machine-frame are a series of standards 24, which carry at their upper ends a rod 25 extending longitudinally of the table above the sets of calender-rolls. Fast on the rod above each set of calender-rolls is a hanger or depending support 26, from the lower portion of which laterally extends a counter-rod 27 having disposition substantially parallel to the rod 25. An abutment 28 is held adjustably on the counter-rod near its free end by a set-screw 29, and depending from the abutment is a stop 30. The abutment holds on the counter-rod a boxing 31, which is a part of a swing-frame that comprises side arms 32, which flare outwardly from the boxing, as shown at 33, and then continue in parallel relation to each other to their free ends. One of the flaring portions 33 of the frame is capable of contact with the stop 30, whereby downward movement of the free ends of the arms is limited and contact of any part of the swing-frame with the sliver-table is prevented. The side arms are a sufficient distance apart to enable them to straddle or to be disposed slightly beyond each end of the top calender-roll, and they are so curved that they extend from behind and under the shaft of that roll with their free ends above the sliver-table beyond the place of emergence of sliver from between the rolls. One of the side arms near its free end has secured thereto or formed integrally therewith a depending plate 34, which extends partially across the space between the two arms and fully across the path of movement of the sliver from between the rolls. The plate is cut away from its lower edge, whereby there is formed an opening or passage-way 35 for movement therethrough under normal conditions of sliver from the rolls to the table. A rock-shaft or its equivalent 36 is mounted pivotally near the ends of the arms and outside of and adjacent to the plate 34, and from this shaft depends a sliver-contact plate or member 37 of non-conductive material arranged to trail on the moving sliver. A pawl 38 also extends from the rock-shaft in such direction that it is capable of engagement with a ratchet-wheel 39 loose on the shaft 20 of the upper calender-roll and adjacent to an end of that roll. The relative disposition of the parts is such that, when the plate 37 has sliver thereunder, the pawl is kept out of engagement with the ratchet-wheel, and that, on running out of the sliver and a consequent assumption of a lower position by the plate, the pawl will engage the rack, close an electric circuit, and stop the machine in a manner hereinafter described. Moreover, when the sliver breaks beyond the calender-rolls, or when it stops being drawn for any reason beyond the delivery side of the rolls while the machine is in operation, sliver will accumulate between the rolls and the plate 34 and by pushing of the material against the plate as it is delivered from the rolls it will operate to raise the swing-arms to contact with the upper calender-roll shaft 20 and thereby close the electric circuit; or such lifting of the free end of the swing-frame may be such as to permit the plate 37 to swing sufficiently to bring the pawl 38 into engagement with the ratchet-wheel 39 and close the circuit. It is immaterial whether the circuit is closed by either or both of these methods.

As the sliver is delivered to the table, it is drawn to the end thereof by draw-box rolls 44 and through a draw-box trumpet 45 by an upper calender-roll 46 on a shaft 47 and a lower calender-roll 48, whence it is drawn by any suitable means, as by coiler-rolls 49, and delivered into a coiler-can 50, all in a manner commonly practised in the art.

In order that the machine may be stopped in case the sliver breaks or becomes exhausted between the draw-box calender-rolls and the coiler-rolls, the stop-motion includes means controlled by the sliver between those two sets of rolls for closing an electric circuit and causing operation of the stop-motion.

The rod 25 extends at one end over the draw-box, and on that end of the rod there is secured by a set-screw 51 an arm 52, which is curved so that it extends laterally, downwardly, and longitudinally from the rod. The free end of the arm has extending laterally therefrom a pin or shaft 53, which is disposed transversely of the path of movement of the sliver and slightly removed from the normal position of movement of the sliver. A sliver-contact member is carried by the shaft 53. This member includes an intermediate portion 54, preferably of metal, which is journaled on the shaft, and which has its lower side or edge curved from the path of travel of the sliver, as shown at 55, in order that the sliver may easily pass thereover. A plate 56, preferably of wood, is secured to and extends upwardly from the intermediate portion, and it is arranged to trail on the moving sliver. A finger or pawl 57 extends downwardly from the intermediate portion, and it is arranged to be capable of contact with a ratchet-wheel 58 loose on the shaft 47 of the upper draw-box calender-roll 46 when the contact member swings in one direction, whereby an electric circuit is closed and the stop-motion caused to operate. A horizontally-adjustable abutment 59 is secured to the coiler-can opposite to the plate 56 of the contact member, and the sliver moves in contact with this abutment or guide in its passage from the calender-rolls to the top of the can. The contact member is so positioned that the plate portion thereof will rest on the sliver during its normal movement, and the abutment is so adjusted that, when there is sliver between it and the plate, the finger or pawl 57 is out of contact with the ratchet-wheel 58. When the sliver is exhausted between the plate and abutment, as when there is breakage, the plate will swing outwardly or toward the abutment and thereby cause the finger or pawl to engage the ratchet-wheel and close the circuit. The plate 56 is of non-conductive material so that it will not close a circuit through the machine in case it contacts with the abutment when the sliver has run out. An extension 60 projects upwardly from the upper end of the arm 52 above the rod 25, and thereon is a screw 61, having thereon a lock-nut 62. One end of the screw extends toward the plate 56, and it serves as a stop for the plate to rest against while an operator is tying broken sliver after stoppage of the machine, so that the lower curved part of the intermediate portion 54 will not swing too far into the normal path of movement of the sliver and so that it will be held in such position that the sliver itself by bearing against the curved part will cause the contact member to swing to normal position when normal movement of the sliver is resumed.

For the purpose of stopping the machine when there is a lap run out, there is provided a device shown more particularly by Figs. 7, 8, and 9, in which 63 designates the lap; 64 the rear rolls for the lap carried on a shaft 65; 66 ratchet-wheels rotatably mounted on the shaft 65 one at each end of each roll 64 and rotating normally with the rolls under the influence of frictional contact imposed by washers 67 and collars 68, which keep the wheels against the ends of the rolls; 69 the front rolls for the lap carried on a shaft 70; and 71 a longitudinal frame member of the machine adjacent to the rolls 69.

Fixedly secured to the frame member 71 by bolts 72 and insulated by non-conductive material 73 there are several brackets or arms 74 each extending rearwardly between adjacent ends of the rolls 69 and under the shaft 70. These arms support and have securely held in their ends by set-screws 75 a longitudinally-extending rod 76, which the material 73 insulates from the machine. Upright standards 77 are secured to the rod 76, one opposite to each ratchet-wheel 66. Each standard has extending from its upper end in parallel relation to the rolls a pin or stub-shaft 78 on which is journaled an arm 79 intermediate its ends. The arm 79 on one side of its pivotal point extends as a weighted pawl 80 toward one of the ratchet-wheels 66, with which its end is capable of engagement. The arm on the other side of its pivotal point has a non-conductive lap-contact member 81 extending therefrom into a slot 82 in one of the lap-aprons 83 of the machine. Each pair of lap-rollers, it will be seen, has a pivoted arm 79 at each end, and one of the contact members 81 extends into each side portion of the lap-apron.

The relative arrangement of the parts is such that, when the lap is passing normally over the apron, the pawl 80 will be kept out of engagement with the ratchet-wheel 66 by contact of the member 81 with the lap. When the lap runs out and there is no lap to keep the member 81 down, the weighted pawl, which overbalances the other side of the arm 79, will be permitted to fall into engagement with the ratchet-wheel, whereby a circuit is closed and the machine is caused to stop.

The ratchet-wheels 39, 58, and 66, which are engaged, respectively, by pawls 38, 57, and 80 when the circuit is to be closed, more reliably maintain engagement and electrical contact with the pawls than if the sliver-controlled contact members merely touched a smooth part and they prolong the contact for the period required to attain the result for which the circuit is closed. Moreover, in view of the reliability of the contact, the liability of arcing of the current between the contact points is reduced materially.

The circuit-closers herein described are adapted for use with any suitable mechanism, whose action is controlled or initiated by an electric circuit, arranged to stop the machine with which the circuit-closers are associated when any of the latter acts on occurrence of certain conditions in the material being treated as hereinbefore described.

Figure 2:
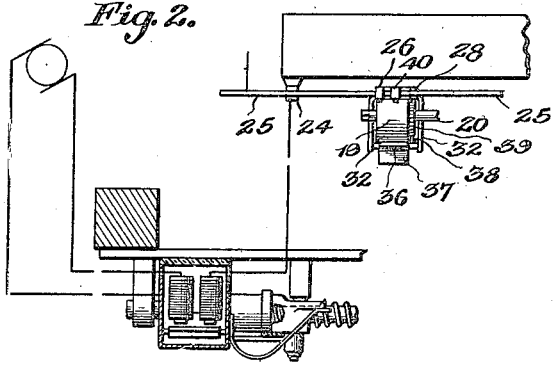
Fig. 2 is a diagrammatic view illustrative of the wiring.
Figure 3:
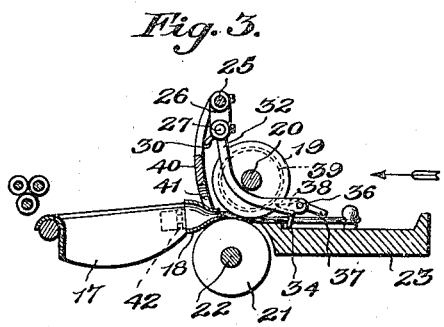
Fig. 3 is a sectional view through the sliver-pan, trumpet, and sliver-table.
Figure 4:
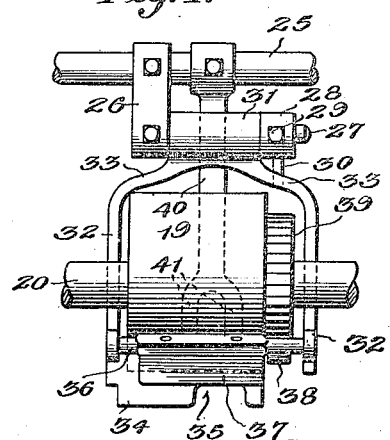
Fig. 4 is a view of parts as seen when looking in the direction of the arrow, Fig. 3.

As an example of the manner in which circuit-closers such as exemplified herein may be employed, those disclosed more particularly by Figs. 3 and 4, and 7 and 8, are shown, respectively, by Figs. 2 and 9 in association with an electric circuit set forth diagrammatically in connection with fragmentary views of a power-shifting mechanism of the kind shown in detail by the hereinbefore-mentioned prior application Ser. No. 860,401. In these arrangements, one wire of the circuit is connected to the insulated rod 25, in electrical connection with which rod are the sliver-controlled circuit-closers, that is to say the arms 32 of the swing-frame, the pawl 38 of the contact member 37, and the finger or pawl 57 of the contact member carried by the shaft 53, and a conductor leads from the rod 25 to the insulated rod 76 of the lap-controlled circuit-closer; and the other wire of the circuit is grounded in the machine. When any or all of the circuit-closers mentioned operate as heretofore described, the calender-roll and lap-roll shafts being electrically associated with the machine, the circuit is closed, and the action of the power-shifting mechanism thereby is instituted.

Having thus described the invention, what is claimed as new, and desired to be secured by Letters Patent, is—

1. In a machine in which material treated continuously moves, a stop-motion comprising the combination, with a roll affecting movement of the material and a shaft upon which the roll is mounted, of a ratchet-wheel loose on the roll-shaft, a pivoted member arranged to trail on the material, a pawl on said member arranged to engage said ratchet-wheel on occurrence of an abnormal condition in the material, an electric circuit having said pawl as one pole and said ratchet-wheel as another pole, and a power-shifting device controlled by said circuit.

2. In a machine in which material treated continuously moves, a stop-motion comprising the combination, with a roll affecting movement of the material, a shaft on which the roll is mounted, and a ratchet-wheel on said shaft, of a pivotally-mounted arm possessing a tendency to move into engagement with said ratchet-wheel and a part extending contiguously to the moving material and by contact with the material normally holding said pawl out of engagement with said ratchet-wheel, an electric circuit having said pawl as one pole and said ratchet-wheel as another pole, and a power-shifting device controlled by said circuit.

3. In a machine in which material treated continuously moves, a stop-motion comprising the combination, with a roll affecting movement of the material and a shaft upon which the roll is mounted, of a pivoted member arranged to trail on the material, a pawl controlled by said member, a rotatably-mounted member having a roughened surface arranged to be engaged by said pawl on occurrence of an abnormal condition in the material, an electric circuit having said pawl as one pole and said rotatably-mounted member as another pole, and a power-shifting device controlled by said circuit.

4. In a machine in which material treated continuously moves, a stop-motion comprising the combination, with a roll affecting movement of the material and a shaft upon which the roll is mounted, of a rotatably-mounted toothed member, a pivoted member arranged to trail on the material, a pawl controlled by said member arranged to engage said toothed member on occurrence of an abnormal condition in the material, an electric circuit having said pawl as one pole and said toothed member as another pole, and a power-shifting device controlled by said circuit.

In witness whereof, I affix my signature.

MARY J. DOCKRAY,
*Administratrix of the estate of said Peter J. Dockray, deceased.*

Copies of this patent may be obtained for five cents each, by addressing the "Commissioner of Patents, Washington, D. C."